United States Patent [19]

Corpora et al.

[11] Patent Number: 5,325,410
[45] Date of Patent: Jun. 28, 1994

[54] CLEAN-UP SYSTEM FOR THE CHEMICAL DECONTAMINATION OF A NUCLEAR REACTOR PRIMARY SYSTEM

[75] Inventors: Gary J. Corpora, Monroeville; Frank I. Bauer, Perry Twp., Lawrence County; Thomas G. Bengel, Plum Borough; Phillip E. Miller, Greensburgh, all of Pa.

[73] Assignee: Westinghouse Electric Corporation, Pittsburgh, Pa.

[21] Appl. No.: 983,503

[22] Filed: Nov. 30, 1992

[51] Int. Cl.$^5$ ............................................. G21C 19/42
[52] U.S. Cl. ..................... 376/313; 376/305; 376/308
[58] Field of Search ................. 376/310, 313, 308, 305

[56] References Cited

U.S. PATENT DOCUMENTS

| | | | |
|---|---|---|---|
| 3,873,362 | 3/1975 | Mihram et al. | 134/3 |
| 3,890,233 | 6/1975 | Gischel | 376/313 |
| 3,895,465 | 7/1975 | Korn et al. | 376/305 |
| 4,042,455 | 8/1977 | Brown | 376/310 |
| 4,623,510 | 11/1986 | Troy | 376/272 |
| 5,024,805 | 6/1991 | Murray | 376/305 |
| 5,089,216 | 2/1992 | Schlonski et al. | 376/308 |
| 5,089,217 | 2/1992 | Copora et al. | 376/313 |
| 5,139,734 | 8/1992 | Corpora et al. | 376/310 |

Primary Examiner—Donald P. Walsh
Assistant Examiner—F. Voss
Attorney, Agent, or Firm—Joseph C. Spadacene

[57] ABSTRACT

A chemical decontamination clean-up system for use on-line in a nuclear reactor primary system includes a pump arrangement within the nuclear reactor primary system for pumping primary system fluids to a cleaning system located directly downstream from the pump assembly. The cleaning system includes a plurality of first demineralizer banks arranged in a predetermined flow pattern for receiving the primary system fluids. Each of the first demineralizer banks comprises at least two individual, resin-filled demineralizers arranged in parallel wherein primary system fluids are demineralized. Each of the demineralizer banks includes valving for selectively directing the primary system fluids from the pump arrangement to selected demineralizer banks in the plurality of the first demineralizer banks. A second demineralizer bank receives the primary system fluids from the plurality of first demineralizer banks. The second demineralizer bank includes at least two individual, resin-filled demineralizers arranged in parallel wherein primary system fluids are "finish" demineralized. A return system receives the primary system fluids from the second demineralizer bank and directs the fluids back to the nuclear reactor primary system. The return system includes at least one trap for receiving the primary system fluids from the second demineralizer bank and operable to remove resin suspended in the primary system fluids, and at least one filter downstream from the trap for removing solids suspended in the primary system fluids prior to the return of the fluids to the nuclear reactor primary system.

11 Claims, 2 Drawing Sheets

CLEAN-UP SYSTEM FOR THE CHEMICAL DECONTAMINATION OF A NUCLEAR REACTOR PRIMARY SYSTEM

BACKGROUND OF THE INVENTION

1. Field of the Invention

The present invention relates generally to the field of nuclear reactor primary system decontamination and, more particularly, to an improved system for removing suspended and dissolved solids from nuclear reactor primary system fluids after the primary system has been subjected to a chemical decontamination process.

2. Description of the Prior Art

The problem of excessive personnel exposures caused by high background radiation levels in a nuclear reactor primary system, such as in a pressurized water reactor (PWR) system, and the resultant economic cost of requiring personnel rotation to minimize individual exposure is significant at many nuclear plants. These background levels are principally due to the build-up of corrosion products in certain areas of the plant. The build-up of corrosion products exposes workers to high radiation levels during routine maintenance and refueling outages.

As a nuclear power plant operates, the surfaces in the core and other portions of the primary system corrode. Corrosion products, referred to as "crud", are activated by transport of the corroded material to the core region by the reactor coolant system. Subsequent release of the activated crud and redeposition elsewhere in the system produces radiation fields in piping and components throughout the primary system, thus increasing radiation levels throughout the plant. The activity of the corrosion product deposits is predominantly due to cobalt 58 and cobalt 60. It is estimated that between 80% and 90% of personnel radiation exposure can be attributed to these elements.

One way of controlling worker exposure, and of dealing with this problematic situation, is to periodically decontaminate the nuclear steam supply system using chemicals, thereby removing a significant fraction of the corrosion product oxide films. Prior techniques have done very little to decontaminate the primary system as a whole, typically focusing only on the heat exchanger (steam generator) channel heads.

Two different chemical processes, referred to as LOMI (developed in England under a joint program by EPRI and the Central Electricity Generating Board) and CAN-DEREM (developed by Atomic Energy of Canada, Ltd.), have been used for small scale decontamination in the past. These processes are multi-step operations, in which various chemicals are injected, recirculated, and then removed by ion exchange. Although the chemicals are designed to dissolve the corrosion products, some particulates are also generated. Another method of chemical decontamination which focuses on the chemistry of decontamination, is disclosed in U.K. Patent Application No. GB 2 085 215 A (Bradbury et al.). However, this patent application discloses little of the methodology to be used in applying that chemistry to full scale nuclear reactor primary system decontamination.

While these chemical processes had typically been used only on a localized basis, the use of these chemical processes has now been considered for application on a large scale, full system chemical decontamination. Such an application is disclosed generally in U.S. Pat. No. 5,089,216, assigned to the assignee of the present invention and entitled "System for Chemical Decontamination of Nuclear Reactor Primary Systems".

The estimated collective radiation dose savings over a 10-year period following nuclear reactor primary system decontamination is on the order of 3,500–4,500 man rem, depending upon whether or not the fuel is removed during decontamination. At any reasonable assigning of cost per man rem, the savings resulting from reduced dosage levels will be in the tens of millions of dollars.

As a result of the recognition that full nuclear reactor primary system chemical decontamination is indeed possible from a technical standpoint and, more importantly, advantageous in order to increase collective radiation dose savings, systems have been suggested for effective and economic removal of dissolved and particulated corrosion products generated by the application of these known chemical decontamination techniques. One such system is disclosed in U.S. Pat. No 5,089,217, assigned to the assignee of the present invention and entitled "Clean-Up Sub-System for Chemical Decontamination of Nuclear Reactor Primary Systems". In this sub-system, chemically-processed fluids containing suspended and dissolved solids are directed first through a back-flushable filter and, thereafter, through one or more cartridge filters. After this initial filtering of suspended sol ids, these fluids are directed to one or more banks of demineralizers for removal of dissolved solids, followed by additional cartridge filtering to remove any resin fines carried out of the demineralizer banks. After final filtering, the fluids are returned to the primary system. Although this clean-up sub-system adequately removes dissolved and suspended solids from nuclear reactor primary system fluids, the system as designed requires that the resin beds within each of the demineralizers be replaced at least once during the chemical decontamination clean-up process. Although the replacement of demineralizer resin beds may be accomplished utilizing known demineralizer back-flushing and refilling techniques, replacement of these demineralizer resin beds during the clean-up process requires additional operator attention and increases the cost of the clean-up equipment (i.e., storage tanks, pumps, valves, piping and electrical control devices) due to the additional storage and handling of the spent resin which must be accomplished without delay the clean-up process itself.

Consequently, there is a need for an improved clean-up system which operates effectively and economically to remove dissolved and particulated corrosion products from primary system fluids generated by the application of known chemical decontamination techniques.

SUMMARY OF THE INVENTION

The present invention is directed to an improved clean-up system operable in conjunction with the chemical decontamination of a nuclear reactor primary system designed to satisfy the aforementioned needs. The improved clean-up system of the present invention eliminates the need to replace demineralizer resin beds during the decontamination clean-up process, thereby providing a safer, less hazardous working environment for both clean-up and utility personnel.

Accordingly, the present invention is directed to a chemical decontamination clean-up system for use on-line in a nuclear reactor primary system. The clean-up system utilizes one or more existing pumps within a nuclear reactor primary system to pump primary system fluids subjected to a decontamination process and flowing through the nuclear reactor primary system to a cleaning system located directly downstream from the pumps. The cleaning system includes a plurality of first demineralizer banks arranged in a predetermined flow pattern for receiving the primary system fluids. Each of the first demineralizer banks comprises at least two individual, resin-filled demineralizers arranged in parallel wherein primary system fluids are demineralized. The primary system fluids may be directed from the pumps to selected ones of the plurality of first demineralizer banks. A second demineralizer bank receives the primary system fluids from the plurality of first demineralizer banks. The second demineralizer bank comprises at least two individual, resin-filled demineralizers arranged in parallel wherein primary system fluids are "finish" demineralized to remove trace quantities of the dissolved solids. After passing through the second demineralizer bank, the primary system fluids pass through a trap and filter arrangement and thereafter back to the nuclear reactor primary system.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
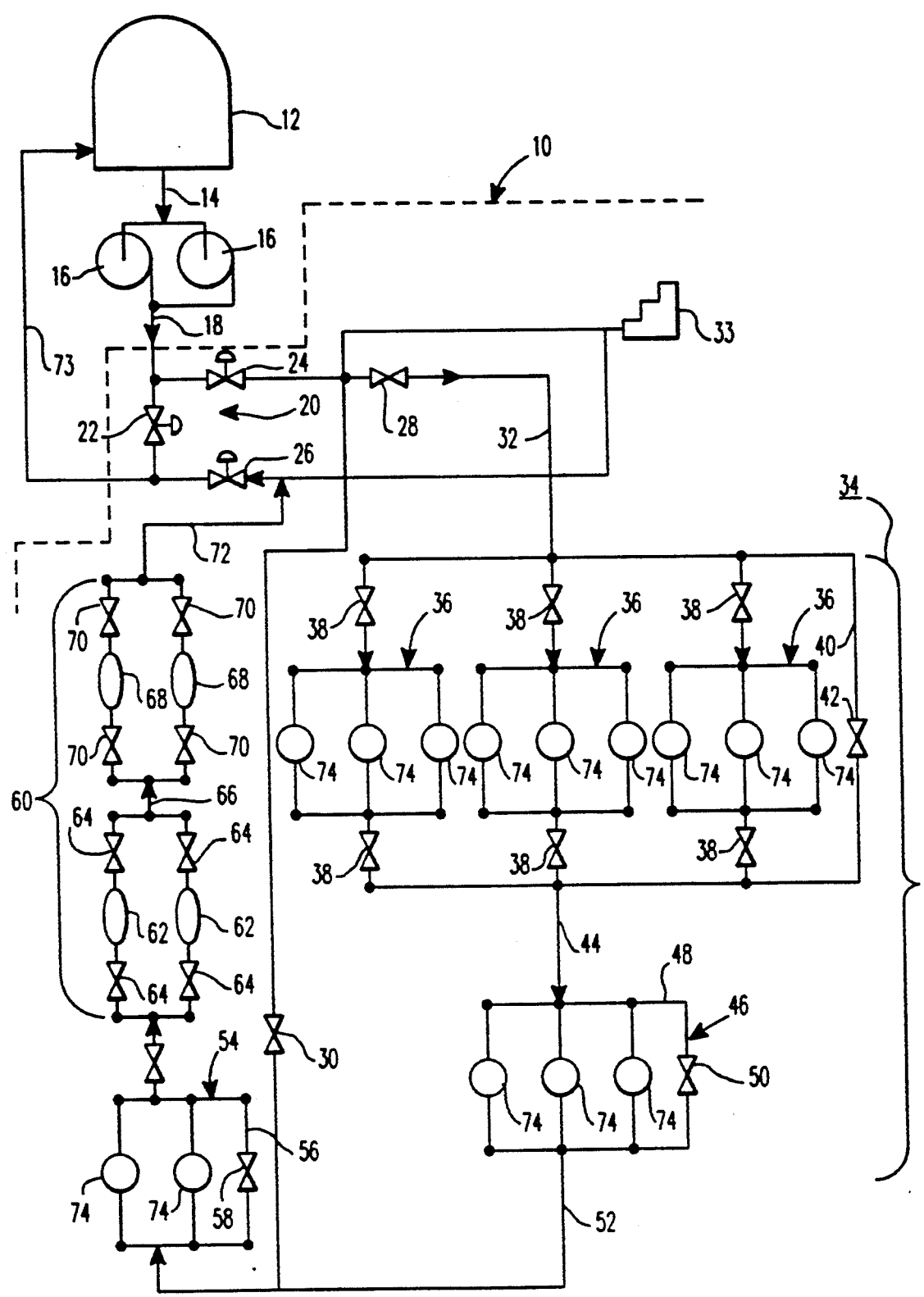
FIG. 1 is a schematic flow diagram illustrating the chemical decontamination clean-up system of the present invention.

Referring now to the drawings, and particularly to FIG. 1, there is illustrated a schematic flow diagram of an improved clean-up system operable in conjunction with the chemical decontamination of a nuclear reactor primary system to remove dissolved and suspended solids from the fluids flowing through the nuclear reactor primary system. The improved clean-up system, which is the subject of the present invention, is generally designated by the numeral 10. The clean-up system 10 is operable to receive primary system fluids circulating throughout a nuclear reactor primary system such as schematically illustrated by the numeral 12 and remove suspended and dissolved solids from the fluids generated as a result of the primary system being subjected to a conventional chemical decontamination process. The primary system fluids containing the suspended and dissolved solids are introduced into the clean-up system 10 via piping 14 and a pair of residual heat removal (RHR) pumps 16. The residual heat removal pumps 16 provide a pressure head for the primary system fluids as the fluids flow through piping 18 and into the clean-up system 10 of the present invention. The pressure head needed for operation of the chemical clean-up system is preferably provided by the residual heat removal pumps 16 since these pumps are already in use in a reactor auxiliary system. The primary system fluids flowing through the piping 18 are introduced into a valve network 20 which includes a throttle valve 22 and shutoff valves 24, 26, 28 and 30. With the valves 24, 26, and 28 in the open position, valve 30 in the closed position and throttle valve 22 either partially or fully open, a portion of the primary system fluids discharged from the residual heat removal pumps 16 are directed to the clean-up system 10 wherein suspended and dissolved solids contained within the primary system fluids are removed.

The suspended and dissolved solids contained within the primary system fluids are generated by a conventional decontamination process. In general, suspended solids or particulates will consist of metals (chromium, iron and nickel) and manganese dioxide. Although the exact quantity of metals will depend upon the crud film thickness, the total quantity will typically be between 400 and 1,000 pounds (180 and 450 kg) for a standard four loop reactor system. In normal operation of the decontamination system, the majority of this mass will be dissolved by the decontamination chemicals. As for the undissolved particulates which form the suspended solids, tests have shown that about 70% of the particles will be in a range of between 2 and 8 microns, and their concentration within the primary system fluids will be in the range of between 10 and 15 parts per million.

The manganese dioxide contained in the primary system fluids is generated during the alkaline/permanganate step that is common to both the known CAN-DEREM and LOMI chemical decontamination processes. It was originally thought to be desirable to remove all of this manganese dioxide as particulates rather than allowing it to become a dissolved solid. Since the expected particle size of the manganese dioxide is in a range of between 0.7 and 1.7 microns, filtration had heretofore been believed to be the preferred removal process. After further evaluation, however, it has been determined that manganese dioxide filtration is, in most instances, neither practical nor economical. It has been determined that the manganese dioxide is best treated chemically with oxalic acid, which is injected into the clean-up system 10 via a chemical injection pump 33. The oxalic acid chemically reacts with the manganese dioxide carried by the primary system fluids circulating through the clean-up system 10. The oxalic acid reduces the manganese dioxide to manganous ions, and, as will be explained later in greater detail, these manganous ions are removed by ion exchange.

Regarding the removal of suspended solids or particulates from the primary system fluids, based on the relatively high particulate or solids concentration, it had been thought that the large volume of solids would normally have an adverse affect on downstream demineralizer resin beds in terms of excessive pressure drop or coating of the resins. Therefore, it was believed to be preferable to remove at least a substantial portion of the suspended solids via a filtering system prior to utilization of any ion-exchange beds. However, as will be explained later in greater detail herein, it has been discovered by the inventors of the present invention that the removal of suspended solids prior to utilization of any ion-exchange beds is not required. The inventors have discovered that eliminating the initial filtering system does not adversely affect the clean-up system so long as a sufficient number of ion-exchange beds are utilized during the clean-up process. For example, for a conventional four loop reactor system, it has been found that a minimum of fourteen ion-exchange beds are required. Properly quantifying the total amount of resin and demineralizer vessels required for the clean-up process eliminates the need to backflush the demineralizers during operation of the clean-up system 10 and allows the operators of the clean-up system 10 to postpone resin bed replacement until after the clean-up process is complete.

After the primary system fluids have passed through the piping 18 and the open valves 24, 28, the fluids are directed via piping 32 to a network of first demineralizer banks generally designated by the numeral 34. The network of first demineralizer banks 34 includes one or more cation demineralizer banks 36 which may be selectively chosen by means of the plurality of upstream and downstream valves 38. Additionally, the cation demineralizer banks 36 may be totally bypassed using bypass piping 40 and valve 42. The cation demineralizer banks 36 are operable to remove metals, such as iron, chromium and nickel, and radioactive materials, such as cobalt and cesium, which are dissolved by the decontamination chemicals, as well as manganous ions and the cation species of the decontamination chemicals themselves. In addition to demineralizing primary system fluids flowing through each of the cation demineralizer banks via ion-exchange, each of the demineralizer banks 36 also serves to some degree as a filtration device. Within the cation demineralizer banks 36, larger solids suspended in the primary system fluids are removed as they are trapped within the resin beds of the individual demineralizers forming each bank 36. The construction and operation of each of the individual demineralizers forming each demineralizer bank 36 will be described later in greater detail.

After passage through the cation demineralizer banks 36, the primary system fluids are directed via piping 44 to an anion demineralizer bank 46 which also forms a portion of the network of first demineralizer banks 34 The anion demineralizer bank 46 is used primarily to remove the anionic species of the decontamination chemicals. As with each of the cation demineralizer banks 36, the anion demineralizer bank 46 also serves as a filtration device to trap solids suspended in the primary system fluids. If desired, the anion demineralizer bank 46 may also be bypassed using bypass piping 48 and valve 50.

Eliminating the need to replace resin beds during the clean-up process eliminates the potential delays in the overall decontamination process due to equipment malfunctions or operator errors in operating the resin replacement subsystems during the decontamination process ( i.e. , on critical path). Delays are obviously very costly due to the impact on the utility's outage schedule. Another advantage of the demineralizer arrangement described above is the segregation of cation and anion resins in separate demineralizers. In known systems, which included a minimum number of demineralizer vessels (approximately 9), cation and anion resins were mixed in certain demineralizer vessels. Although this arrangement provides acceptable ion exchange performance, resin performance is less than optimum. That is, ion exchange is slightly more efficient when, for example, process fluids are directed through separate cation and anion beds in series rather than directed through one demineralizer with both cation and anion resins mixed. In addition, this system also provides the flexibility of using only cation or anion resin in the event that unexpected chemistry conditions occur and must be corrected using the resins.

In a preferred embodiment when used with a CAN-DEREM chemical decontamination process, the cation and anion demineralizer banks 36, 46 are illustrated as shown in FIG. 1. Two of the cation demineralizer banks 36 are utilized for the alkaline/permanganate steps and the third bank, containing vessels referred to as Regen beds, would be dedicated to the regeneration step (when 70-80% of the curies will be removed from the primary systems fluids). When the CAN-DEREM chemical decontamination process is utilized on a four loop reactor system, primary system fluids may be treated without replacing the cation and anion demineralizer bank resin beds. When operating with the LOMI chemical decontamination process, the same two banks of cation demineralizer banks 36 can be used. The Regen beds are not required for the LOMI decontamination process.

After passage through the anion demineralizer bank 46, the primary system fluids are directed via piping 52 to a "finish" demineralizer bank 54 wherein the primary system fluids are "polished" to remove substantially all of the dissolved solids (trace levels of dissolved solids) from the primary system fluids. Finish demineralizer bank 54 includes two demineralizers each containing mixed red resin, i.e., a mixture of cation and anion resins. If desired, the finish demineralizer bank 54 may be totally bypassed using the bypass piping 56 and bypass valve 58.

After the primary system fluids are demineralized within the cation and anion demineralizer banks 36, 46, and finish demineralized in the demineralizer bank 54, they are returned to the primary system 12 via return apparatus 60. Return apparatus 60 includes a pair of traps 62 connected in parallel flow relationship. The traps 62 may be selectively placed in the system 10 by operation of the upstream and downstream valves 64. Each trap 62 is designed to prevent large quantities of resin from entering the reactor primary system in the event that a resin retention screen from any of the upstream demineralizer vessels fails (see FIG. 2, numeral 96). Typically, only one of the traps 62 is on line at any given time. After passing through at least one of the traps 62, the primary system fluids are directed via piping 66 to a pair of filters 68. Each of the filters 68 is preferably a high dirt-holding capacity depth filter in a pre-shielded container, and at least two filters 68 are recommended so that one can serve as a backup while the other is in service. Each of the filters 68 include upstream and downstream valves 70 so that an individual filter 68 can be operated, or maintenance performed thereon, independently of the operation of the other filter 68. One preferred filter media is polypropylene or glass fiber. Pleated paper is typically not acceptable because the decontamination chemicals of the standard processes will dissolve the paper. The filters will typically have a nominal rating of three microns or less to allow for fine filtration of solids suspended in the primary system fluids. This nominal three micron rating is acceptable since, as previously described, larger particles suspended in the primary system fluids are trapped within the resin beds of the network of first demineralizer banks 34 and the finish demineralizer bank 54. After the primary system fluids pass through the filters 68, these fluids are reintroduced into the primary system 12 by piping 72, open valve 26 and piping 73.

Figure 2:
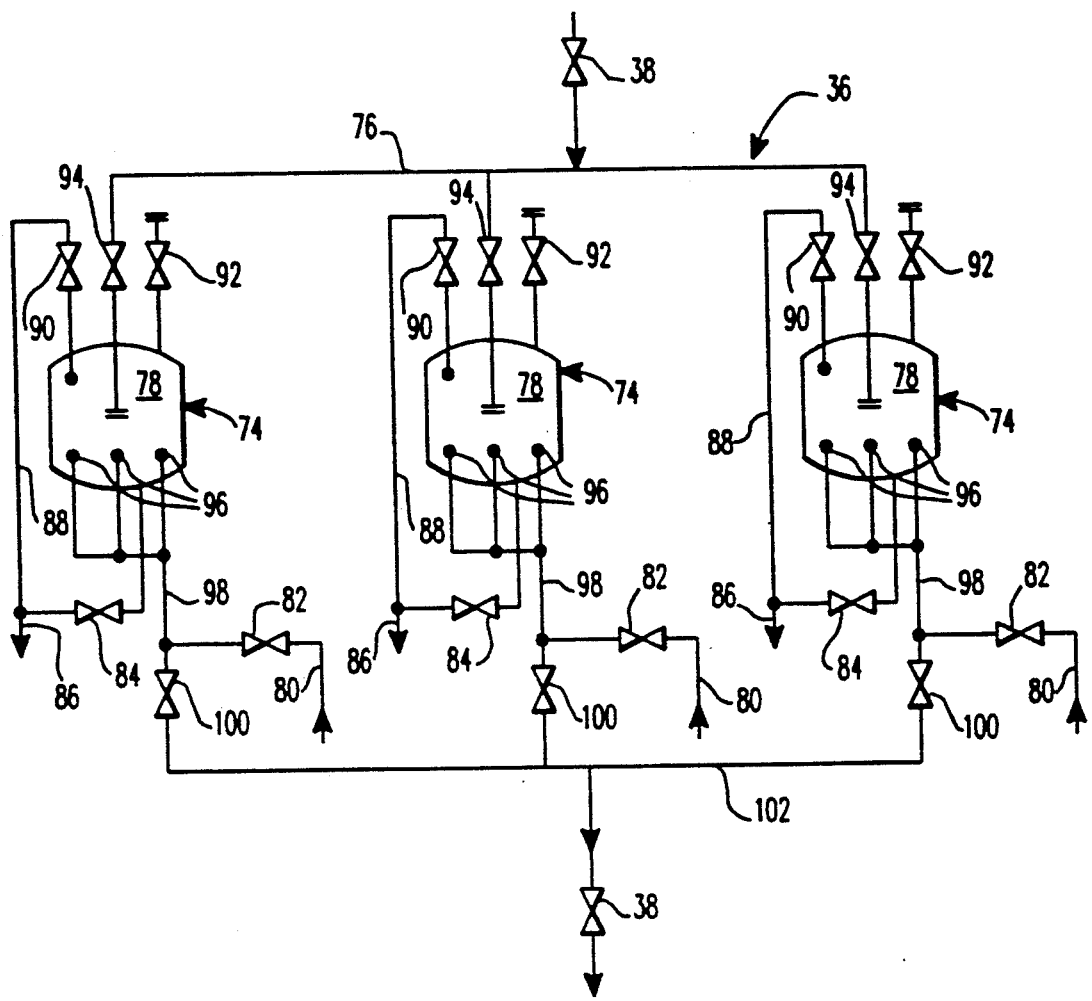
FIG. 2 is a schematic diagram illustrating one of the demineralizer banks which forms a portion of the chemical decontamination clean-up system of the present invention.

Referring now to FIG. 2, there is illustrated in detail one of the cation demineralizer banks 36 of FIG. 1. As seen in FIG. 2, the demineralizer bank 36 is formed from three individual demineralizers 74 connected in parallel flow relationship. The individual demineralizers 74 of demineralizer bank 36 receive primary system fluids via upstream valve 38 and piping 76. Each of the individual demineralizers 74 in the demineralizer bank 36 includes a demineralizer vessel 78. The demineralizer vessels 78 are arranged in order to optimize a variety of factors including: total resin volume requirements; resin bed removal after primary system fluids clean-up; adequate flow rate to achieve the proper clean-up within a viable time period; use of multiple units for operating flexibility and ease of transport; and proper resin loading. The arrangement and number of individual demineralizers 74 are selected so that no resin bed replacement is required during the operation of the clean-up system. The amount of resin loading should allow for sufficient residence time to obtain efficient ion exchange. It is preferable to achieve roughly 99% removal of any chemicals injected within the primary system in less than about 8 hours. Thus, a flow rate in the range of between 1,000 and 1,500 gallons (38,000–57,000 liters) per minute will be necessary for a system volume of approximately 100,000 gallons (380 cubic meters).

Although FIG. 2 illustrates a single cation demineralizer bank 36, it should be understood that the anion demineralizer bank 46 and the "finish" demineralizer bank 54 have the same construction and operate in the same manner. The only difference between the banks 36, 46, and the bank 54 is that the finish demineralizer bank 54 includes two, rather than three, individual demineralizers 74. Based on all of the above factors, the number of cation and anion demineralizer banks required in a preferred embodiment for each chemical decontamination process is illustrated in FIG. 1. Further, in the preferred embodiment as illustrated in FIGS. 1 and 2, each of the cation demineralizer banks 36 contains three demineralizer vessels 78 sized such that each demineralizer vessel 78 will not require resin replacement during chemical decontamination clean-up. Similarly, neither the anion nor finish demineralizer banks will require resin bed replacement until after the chemical decontamination clean-up is complete.

While alternative arrangements are possible, it is preferable to replace the resin bed within each demineralizer vessel 78 after primary system fluids clean-up is complete in the following manner. Sluice water flowing through the piping 80 flows through the valve 82 and into the vessel 78 to flush out the spent resin from the vessel 78 through the valve 84 and thereafter the piping 86. Spent resin flowing through the piping 86 is discharged into a radioactive shielded container (not shown) for transporting the spent resin to a burial site for final disposal. Alternate flow for venting and other purposes, such as initial fluffing of the spent resin prior to removal, is provided by the piping 88 and the valve 90. Fresh resin can thereafter be provided to the demineralizer vessel 78 through the valve 92.

In normal operation, the primary system fluids enter through the upstream valve 38 and piping 76 and are directed to one or more of the demineralizer vessels 78 through the valves 94. After undergoing ion-exchange within the vessels 78 to remove dissolved solids, the primary system fluids are removed via the screened outlets 96 and the piping 98 through the valve 100. The piping 102, which extends between the valves 100 and the downstream valve 38, transfers the primary system fluids to the piping 44 illustrated in FIG. 1. As previously described, although FIG. 2 has been described with reference to a cation demineralizer bank 36 formed from a plurality of individual demineralizer vessels 78 and attendant valving and piping, this demineralizer bank construction and theory of operation also applies to the individual demineralizer vessels forming the anion demineralizer bank 46 and the finish demineralizer bank 54.

Figure 3:
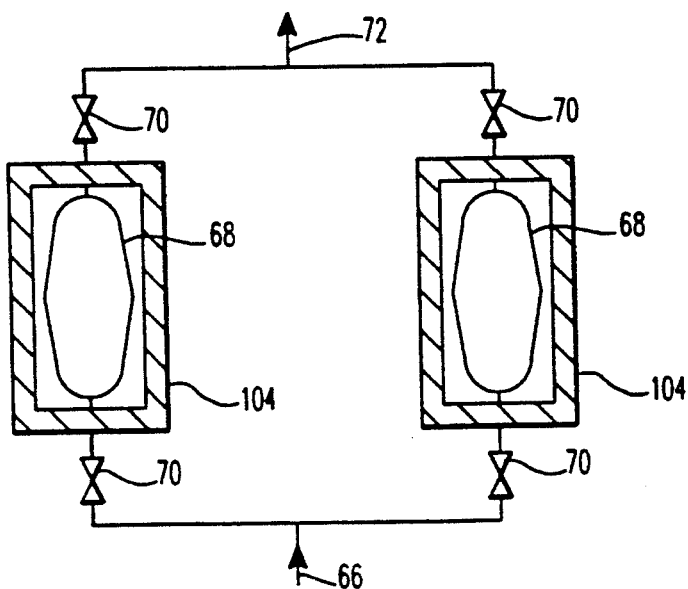
FIG. 3 is a schematic illustration of a pair of filters also forming a portion of the clean-up system of the present invention and positioned within a pair of shielded housings.

Now referring to FIG. 3, there is presented a schematic illustration of the pair of filters 68 which form a portion of the return apparatus 60 illustrated and described with reference to FIG. 1. As seen in FIG. 3, each of the filters 68 is enclosed in a shielded housing 104. Each of the housings 104 is designed to minimize the exposure to operating or maintenance personnel from the radioactive particulates which accumulate within the filters 68. Additionally, the shielded housings 104 allow the filters 68 to be removed after the primary system fluids clean-up process is complete by closing the valves 70 upstream and downstream of a particular filter 68. After the upstream and downstream valves 70 associated with a particular filter 68 are closed, the filter 68 and shielded housing 104 may be removed as a single unit and transported to a burial site for final disposal.

As described herein, the clean-up system 10 is operable to remove suspended and dissolved solids from the primary system fluids subjected to a chemical decontamination process. The number of demineralizer banks utilized with clean-up system 10 is chosen so that resin bed replacement is not necessary until the primary system fluids clean-up is complete. Further, since the demineralizer beds themselves are utilized to trap larger suspended solids, the filtering primary system fluids prior to demineralization is not required.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the form hereinbefore described being merely a preferred or exemplary embodiment thereof.

We claim:

1. A chemical decontamination clean-up system for use on-line in a nuclear reactor primary system, said clean-up system comprising:
   a) pump means within the nuclear reactor primary system for pumping primary system fluids flowing through said nuclear reactor primary system to a cleaning system located directly downstream from said pump means;
   b) said cleaning system including a plurality of first demineralizer banks arranged in a predetermined flow pattern for receiving said primary system fluids, each of said first demineralizer banks comprising at least two individual, resin-filled demineralizers arranged in parallel wherein primary system fluids are demineralized;
   c) means for selectively directing said primary system fluids from said pump means to selected ones of said plurality of first demineralizer banks;

d) a second demineralizer bank for receiving said primary system fluids from said plurality of first demineralizer banks, said second demineralizer bank comprising a pair of individual resin-filled demineralizers connected in parallel flow relationship and wherein primary system fluids are finish demineralized; and e) return means for directing said primary system fluids from said second demineralizer bank to said nuclear reactor primary system.

2. The chemical decontamination clean-up system as recited in claim 1, wherein said return means includes:
   at least one trap for receiving said primary system fluids from said first and said second demineralizer banks and operable to remove resin suspended in said primary system fluids; and
   at least one filter for receiving said primary system fluids from said at least one trap and operable to remove particulates suspended therein.

3. The chemical decontamination clean-up system as recited in claim 1, wherein said plurality of first demineralizer banks includes three banks of demineralizers connected in parallel flow relationship and a single bank of demineralizers connected in series flow relationship with said three banks.

4. The chemical decontamination clean-up system as recited in claim 3, wherein each of said demineralizer banks in said first plurality of demineralizer banks comprises three individual demineralizers connected in parallel flow relationship.

5. The chemical decontamination clean-up system as recited in claim 2, wherein said at least one trap includes a pair of traps connected in parallel flow relationship.

6. The chemical decontamination clean-up system as recited in claim 5, which includes valve means for directing said primary system fluids to one of said pair of traps after said primary system fluids have passed through said second demineralizer bank.

7. The chemical decontamination clean-up system as recited in claim 2, wherein said at least one filter includes a pair of filters connected in parallel flow relationship.

8. The chemical decontamination clean-up system as recited in claim 7, which includes valve means for directing said primary system fluids to one of said pair of filters after said primary system fluids have passed through said at least one trap.

9. The chemical decontamination clean-up system as recited in claim 8, wherein each of said filters is positioned within a shielded housing and arranged so that a filter and a shielded housing may be removed from said chemical decontamination clean-up system as a single unit.

10. The chemical decontamination clean-up system as recited in claim 1, wherein:
    the total number of individual, resin-filled demineralizers in said decontamination system is selected to provide that the total amount of resin present in said decontamination system is sufficient to substantially completely demineralize said primary system fluids prior to any of said resin in any of said individual demineralizers being replaced with a new resin.

11. The chemical decontamination clean-up system as recited in claim 10, wherein:
    each of said individual, resin-filled demineralizers in said decontamination system has a construction to facilitate backflushing to remove the resin housed therein; and
    each of said individual, resin-filled demineralizers is backflushed only after said primary system fluid is substantially completely demineralized through operation of said decontamination system.

* * * * *